United States Patent

Draper

[15] 3,644,157
[45] Feb. 22, 1972

[54] METHOD OF MAKING LAMINAR GARMENT BY AUTOGENOUS BONDING OF CONTINUOUS WEBS

[72] Inventor: Neal M. Draper, 25 Hawthorne Road, Short Hills, N.J. 07078

[22] Filed: Jan. 27, 1970

[21] Appl. No.: 6,155

[52] U.S. Cl..............................156/160, 156/164, 156/229, 156/250, 156/163, 156/269, 156/290, 156/322, 156/309, 156/496, 161/147
[51] Int. Cl.......................................B32b 31/00
[58] Field of Search...................156/164, 250, 269, 290, 160, 156/309, 324, 496, 516; 161/147

[56] References Cited

UNITED STATES PATENTS 2,650,182  8/1953  Green.....................................156/269

*Primary Examiner*—Carl D. Quarforth
*Assistant Examiner*—R. E. Schafer
*Attorney*—Cifelli, Behr and Rhodes

[57] ABSTRACT

A laminar garment comprising a first layer of finished material, a second layer of finished material and an intermediate layer of elastic material disposed between the first and second layers of finished material is disclosed as being manufactured by a process wherein the first layer of finished material and the intermediate layer of elastic material are bonded together at selected points, thereafter the second layer of finished material is positioned adjacent the intermediate layer of elastic material and bonded to both the first layer of finished material and the intermediate layer of elastic material at points other than the points of initial bonding between the first layer of finished material and the intermediate layer of elastic material. The method of bonding is disclosed as being heat-pressure bonding, the elastic material being heat-pressure sealable material such as polyester urethane foam.

4 Claims, 5 Drawing Figures

PATENTED FEB 22 1972 3,644,157

INVENTOR
NEAL M. DRAPER
BY MARN & JANGARATHIS
ATTORNEY

METHOD OF MAKING LAMINAR GARMENT BY AUTOGENOUS BONDING OF CONTINUOUS WEBS

BACKGROUND OF THE INVENTION

The present invention relates to a laminar garment which is manufactured in finished form without a requirement for stitching or other manufacturing processes involving hand labor for securing layers. The invention relates particularly to disposable garments, e.g., disposable diapers, disposable panties, disposable hospital garments, disposable military undergarments, disposable sanitary garments and the like, wherein the garments are manufactured from inexpensive materials such as cellulosic materials (paper) and the like.

Recent advances in the garment industry have related to the manufacture of disposable garments. Such garments, in order to be disposable, must be inexpensive both with respect to the materials used and with respect to the mode of manufacture so that the cost to the average consumer is not prohibitive. The advantages gained from the provision of an inexpensive disposable garment are legion. More specifically, disposable diapers and undergarments obviate the necessity for washing which, particularly, in the case of diapers, is an unpleasant and time-consuming operation. Additionally, the provision of disposable hospital garments allows for the maintenance of sterile conditions not capable of being accomplished through the use of garments which are intended for more than one wearing.

SUMMARY OF THE INVENTION

It is the principal object of the invention therefore to provide a simple and inexpensive disposable garment and a relatively simple and inexpensive method of manufacturing said disposable garment.

This object is achieved by a laminar garment according to the invention comprising a first and second layer of finished material, e.g., a fabric, paper, or nonwoven material, separated by a layer of elastic material capable of being heat-pressure bonded.

A method for manufacturing a laminar garment according to the invention may include the steps of stretching a strip of elastic material, positioning a first strip of finished material adjacent one surface of the stretched elastic material and heat pressure bonding the two together at selected points, positioning a second strip of finished material adjacent an opposed surface of the stretched elastic material and thereafter bonding both strips of finished material and the stretched elastic material at points other than the points of bonding of the first strip of finished material and the strip of elastic material, and thereafter cutting the bonded laminar garment from the strips.

BRIEF DESCRIPTION OF THE DRAWINGS

A more complete understanding of the present invention may be had from the following detailed description particularly when considered in the light of the attached drawings wherein.

DETAILED DESCRIPTION

Figure 1:
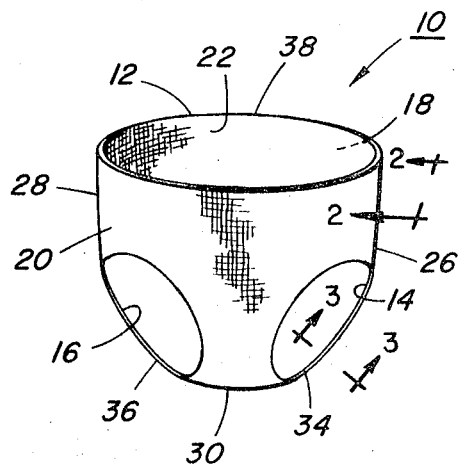
FIG. 1 is a perspective view of a disposable garment according to the invention.
Figure 3:
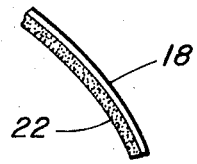
FIG. 3 is a cross-sectional view through the plane 3—3 of FIG. 1.

Considering now the structure and manufacture of garments according to the invention, there is shown in FIG. 1 disposable underpants designated generally by the reference numeral 10. Garment 10 is a conventional style brief having a trunk opening 12 and left and right leg openings 14 and 16 respectively.

Figure 2:
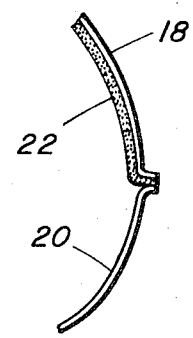
FIG. 2 is a cross-sectional view through the plane 2—2 of FIG. 1.

As may be best seen from FIG. 2, garment 10 comprises a three layer structure including a first layer 18 of finished material, a second layer 20 of finished material and an intermediate layer 22 of elastic material which is capable of heat or heat-pressure bonding, e.g., a polyester urethane foam or other heat-pressure sealable elastomer.

As is discussed below in detail with respect to the manufacture of garment 10, the first, second and intermediate layers 18, 20, 22 of material are heat-pressure bonded together along three bonding lines. The three bonding lines are shown in FIG. 1 as left side bonding line 26, right side bonding line 28 and crotch bonding line 30. Additionally, first layer 18 and intermediate layer 22 are secured by heat-pressure bonding along two leg opening bonding lines 34 and 36 and also a waist bonding line 38.

It can be seen, therefore, that the rear section of garment 10 comprises first finished and intermediate layers 18, 22, heat bonded together along bonding lines 26, 28, 30, 34, 36 and 38, and the front section of garment 10 comprises the second finished layer 20 bonded to the intermediate and first finished layers 18, 22 along bonding lines 26, 28 and 30.

Figure 5:
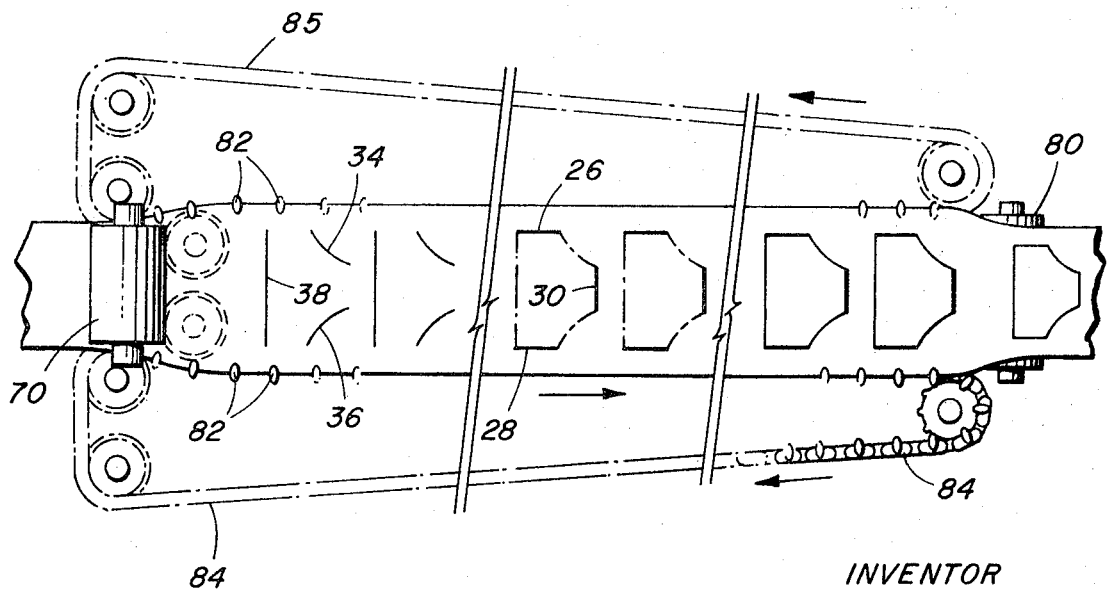
FIG. 5 is a partial plan view of the apparatus of FIG. 4.
Figure 4:
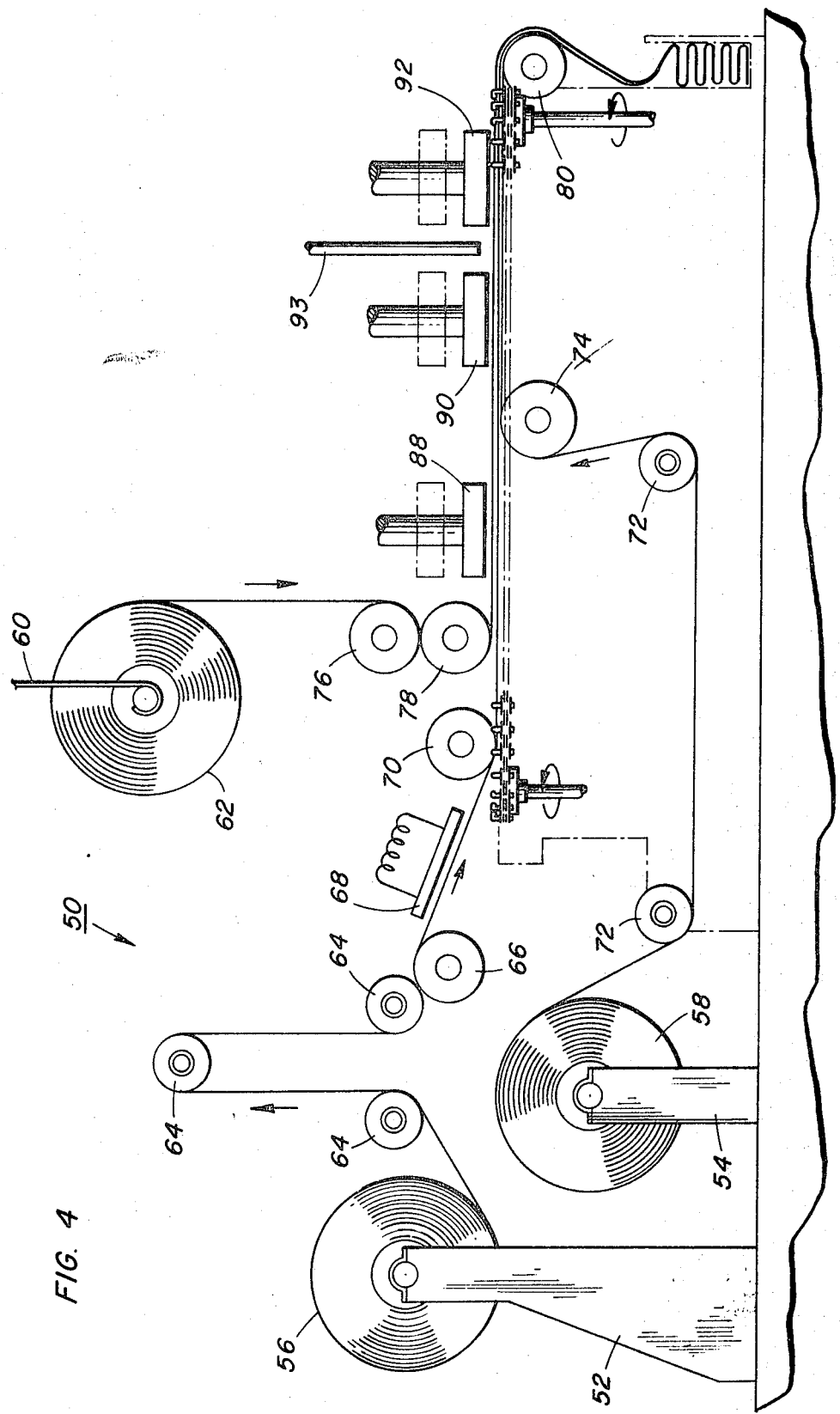
FIG. 4 is a front elevational view of an apparatus for manufacturing the garment of FIG. 1 in accordance with the method of the invention.

Considering now the manufacture of disposable garments according to the invention, and with particular reference to FIGS. 4 and 5, an apparatus for manufacturing disposable garments such as the garment 10 of FIG. 1 is designated generally by the reference numeral 50.

Apparatus 50 comprises first and second roll supports 52, 54 for rotatably supporting a roll 56 of an elastic heat-adhesive material such as polyester urethane foam, and a first roll 58 of finished material such as felted cellulose. A third roll support 60 is positioned to rotatably suspend a second roll 62 of finished material above a bonding line which is discussed below in detail.

Elastic material from the roll 56 is passed around guide/tensioning rolls 64 and over a positioning roll 66 whereafter it is passed under a preheater 68 and a vertical positioning guide roll 70.

Finished material from roll 58 is passed around a guide/tensioning roll 72 and thereafter over a vertical positioning guide roll 74 which positions the finished material from roll 58 adjacent the bottom surface of the elastic material from roll 56.

Finished material from roll 60 is passed around a guide/tensioning roll 76 and thereafter around vertical positioning roll 78 which positions the finished material adjacent the upper surface of the elastic material from roll 56.

After having passed through the bonding and cutting stations as is discussed below, the laminar strip comprising material from rolls 56, 58 and 62 passes over a driving guide roll 80 whereafter the strip is led away from apparatus 50 for further processing, not shown.

Considering now in more detail the actual bonding and cutting process accomplished by apparatus 50, elastic material from roll 56 which has been longitudinally tensioned by guide/tensioning rolls 64 is passed below preheater 68 which preheats the elastic material to a temperature somewhat below bonding temperature but sufficiently elevated to minimize the time required for actual bonding. Thereafter the preheated, longitudinally tensioned elastic material is passed under guide roll 70 and engaged along its edges by clamps 82. Clamps 82 are mounted on controlled path driven chains 84, 85 (FIG. 5) positioned adjacent the edges of the elastic strip for longitudinal travel therewith. The clamping arrangement is a common tenterframe type as is known to those skilled in the art.

It can be seen from FIG. 4 that the clamps 82 project above and below the lower surface of roll 70 and thus above and below the level of the strip of elastic material thereby allowing each of the clamps to engage and hold the elastic strip. Engagement of clamps 82 with the elastic strip occurs substantially adjacent roll 70 whereafter the path of chains 84, 85 causes the clamps 82 to be displaced transversely outwardly thereby stretching the material transversely. The strip of elastic material is maintained in this transversely stretched condition throughout the bonding and cutting operations for forming garment 10. After the cutting operation, and prior to the passage of the now laminar strip over roll 80, the path of chains 84 and 85, and therewith clamps 82, is directed transversely inwardly so as to relieve the transverse tension on the elastic material. Once the transverse tension has been relieved and the material allowed to return to its normal width, clamps 82 open to release material. Thereafter, the clamps are returned to a position adjacent roller 70. Thus, by reason of the transverse stretching action of the clamps 82 and the longitudinal tensioning action of guide/tensioning rolls 64, the strip of elastic material from roll 56 is maintained in a smooth stretched condition throughout the bonding and cutting operations accomplished in the formation of garment 10.

Returning to the position in the process immediately subsequent to the engagement and stretching of the elastic strip from roll 56 by clamps 82, the stretched elastic strip is mated for movement with the first strip of finished material from roll 62. More specifically, the first strip of finished material passes around rolls 76 and 78 to a position immediately over the stretched elastic strip. Because guide/drive roll 80 is the drive roll for all three strips which are joined in manufacturing garment 10, the strips move together at the same velocity and once placed in juxtaposition, they have no relative movement.

The combined stretched elastic strip and thereover the first strip of finished material are then stopped under a first heated platen 88 which is advanced downwardly thereagainst by a suitable motive means (not shown) from a retracted position shown in broken line in FIG. 4 to a sealing position shown in solid line in FIG. 4. With first platen 88 in sealing position, three linear heating surfaces engage the upper surface of the finished material strip causing the strip material to be heated and thereby bonded to the strip of stretched elastic material positioned thereunder. The three linear heating surfaces bond the two strips along a straight line and two curved lines (FIG. 5) which, in finished garment 10, define bonding lines 34, 36 and 38 as seen in FIG. 1.

After bonding by first platen has occurred and first platen has been retracted to the position shown in broken line in FIG. 4, the strips of elastic and first finished materials are advanced by the rotation of roll 80 to a position over roll 74 whereupon the second strip of finished material is positioned adjacent the lower surface of the elastic strip. With the three material layers so positioned, the entire strip is then advanced to a position under a second heated platen 90 which is then advanced against the upper surface of the first strip of finished material, i.e., from the retracted position shown in broken line to the advanced position shown in solid line in FIG. 4.

With second platen 90 in the advanced position, the three layer strip is subjected to heat and pressure along three straight lines (FIG. 5), which lines correspond to bonding lines 26, 28 and 30 as seen in FIG. 1. Upon the completion of sufficient heating and pressure to effect bonding, the required amount of which depends upon the characteristics of the elastic material as is well known to those skilled in the art, the second platen 90 is retracted and the three layer strip is advanced by roll 80 to a position under a cutting platen 92. Cooling air may then be introduced against the material through a vent 93 so as to assist in cooling the heat bonded joints. This step is not necessary, however and the provision of cooling air is not required to practice the inventive method.

It will be recognized that as a result of the bonding accomplished by platens 88 and 90, every bond necessary in manufacturing garment 10 has been completed and the sole remaining operation is that of severing the garment from the three layer strip of material. This cutting operation is accomplished by the advancement of cutting platen 92 from the retracted position shown in broken lines in FIG. 4 to the advanced position shown in solid lines in FIG. 4. The under surface of cutting platen 92 is provided with a continuous knife edge in the shape of the outline of garment 10 (FIG. 5) thereby enabling the complete severing of the garment from the strip in one cutting operation. After the cutting is completed, cutting platen 92 is retracted to the position shown in broken lines, the finished garment 10 is removed from apparatus 50 for preparation for packaging, and the three layer strip is advanced by roll 80 to position the strip for accomplishing the forming operations on the next subsequent garments and to allow reclamation or other disposition of the remaining strip material.

In this regard, it should be noted that the distances between the various platen stations are either a standard distance or some multiple of a standard distance so that each of the various operations of bonding and cutting can be accomplished simultaneously.

The completed garment 10, immediately upon being severed from the three layer strip by the operation of cutting platen 92 reduces in overall dimension since the severing of the garment material from the three layer strip also serves to release the stretching tension on the intermediate layer of elastic material thereby allowing it to return to its original size. The resulting product, therefore, comprises a garment which is capable of being stretched so as to more properly fit the natural contours of the body of the wearer.

It can be seen from the foregoing that the garment of the present invention is a simple and highly useful product which, when manufactured according to the inventive process of the invention is capable of inexpensive manufacture. Further, it is evident that many garments other than the underpants disclosed may be manufactured according to the present process, e.g., military undergarments, hospital garments, children's shirts and the like. It is considered to be manifest, therefore, that many modifications can be made to the present invention without departing from the spirit and scope thereof.

What is claimed is:

1. A method of manufacturing a product comprising a first layer of finished material, a second layer of finished material disposed below said first layer of finished material and a third layer of elastic material disposed between said first and second layers of material comprising the steps of:
    stretching said elastic material; in the transverse direction and simultaneously applying tension to said material in the longitudinal direction
    positioning said first layer of finished material above said layer of stretched elastic material;
    selectively heat pressure bonding said stretched elastic material to said first layer of finished material;
    positioning said second layer of finished material below said stretched elastic material;
    heat-pressure bonding said stretched elastic material, said first layer of finished material and said second layer of finished material at points other than the points of bonding of said first layer of finished material to said stretched elastic material, to complete an outline of said product; and
    severing said first and second finished layers and said third layer of elastic material adjacent the locations of said heat bonding to form said product.

2. The method of claim 1 and further including the step of preheating said elastic material prior to bonding.

3. The method of claim 1 wherein said step of stretching said elastic material comprises:
    engaging said elastic material adjacent the edges thereof by a plurality of clamps; and
    displacing said clamps away from the center of said elastic material.

4. The method of claim 3 wherein said step of heat-pressure bonding said stretched elastic material to said first layer of finished material and said step of heat bonding said stretched elastic material with said first and second layers of finished material comprises:
    advancing heated platens against the surface of said first layer of finished material.

* * * * *